(12) United States Patent
Clark et al.

(10) Patent No.: US 8,816,239 B2
(45) Date of Patent: Aug. 26, 2014

(54) METHOD OF MANUFACTURING A COMPONENT

(75) Inventors: Daniel Clark, Belper (GB); Christopher A. Simmons, Burton on Trent (GB); Mark D. Hancock, Derby (GB)

(73) Assignee: Rolls-Royce PLC, London (GB)

( * ) Notice: Subject to any disclaimer, the term of this patent is extended or adjusted under 35 U.S.C. 154(b) by 404 days.

(21) Appl. No.: 13/080,264

(22) Filed: Apr. 5, 2011

(65) Prior Publication Data

US 2011/0253680 A1 Oct. 20, 2011

(30) Foreign Application Priority Data

Apr. 16, 2010 (GB) .................................. 1006348.5

(51) Int. Cl.
*B23K 26/34* (2014.01)
*B29C 67/00* (2006.01)
*B23K 26/14* (2014.01)

(52) U.S. Cl.
CPC ............. *B23K 26/1411* (2013.01); *B23K 26/34* (2013.01)
USPC ....................................................... 219/76.1

(58) Field of Classification Search
CPC .... B23K 26/14; B29C 67/0077; B28B 17/00; G06K 9/00
USPC ............................ 219/121.63–121.66, 121.84
See application file for complete search history.

(56) References Cited

U.S. PATENT DOCUMENTS

| | | | |
|---|---|---|---|
| 6,392,190 B1 * | 5/2002 | Sue et al. ................. | 219/121.59 |
| 6,727,459 B1 * | 4/2004 | Bialach .................... | 219/121.64 |
| 2008/0251504 A1 * | 10/2008 | Lu et al. .................. | 219/121.64 |

FOREIGN PATENT DOCUMENTS

| EP | 1 491 281 A2 | 12/2004 |
|---|---|---|
| GB | 2 453 945 A | 4/2009 |

OTHER PUBLICATIONS

Search Report issued in GB1006348.5, dated Jun. 21, 2010.

* cited by examiner

*Primary Examiner* — Brian Jennison
(74) *Attorney, Agent, or Firm* — Oliff PLC

(57) ABSTRACT

A method of manufacturing a component. The method includes the steps of heating a working region of a substrate with a heating means; directing a material into the working region to bring the material into a temporary molten state, and depositing said material on the substrate such that when the material solidifies it forms at least part of the component. The heating means power output, stand off, orientation, speed and direction of travel relative to the substrate are adjustable and controlled throughout the material deposition process to control the shape and/or size of the working region to thereby control the distribution and rate of heat delivery to the substrate.

15 Claims, 7 Drawing Sheets

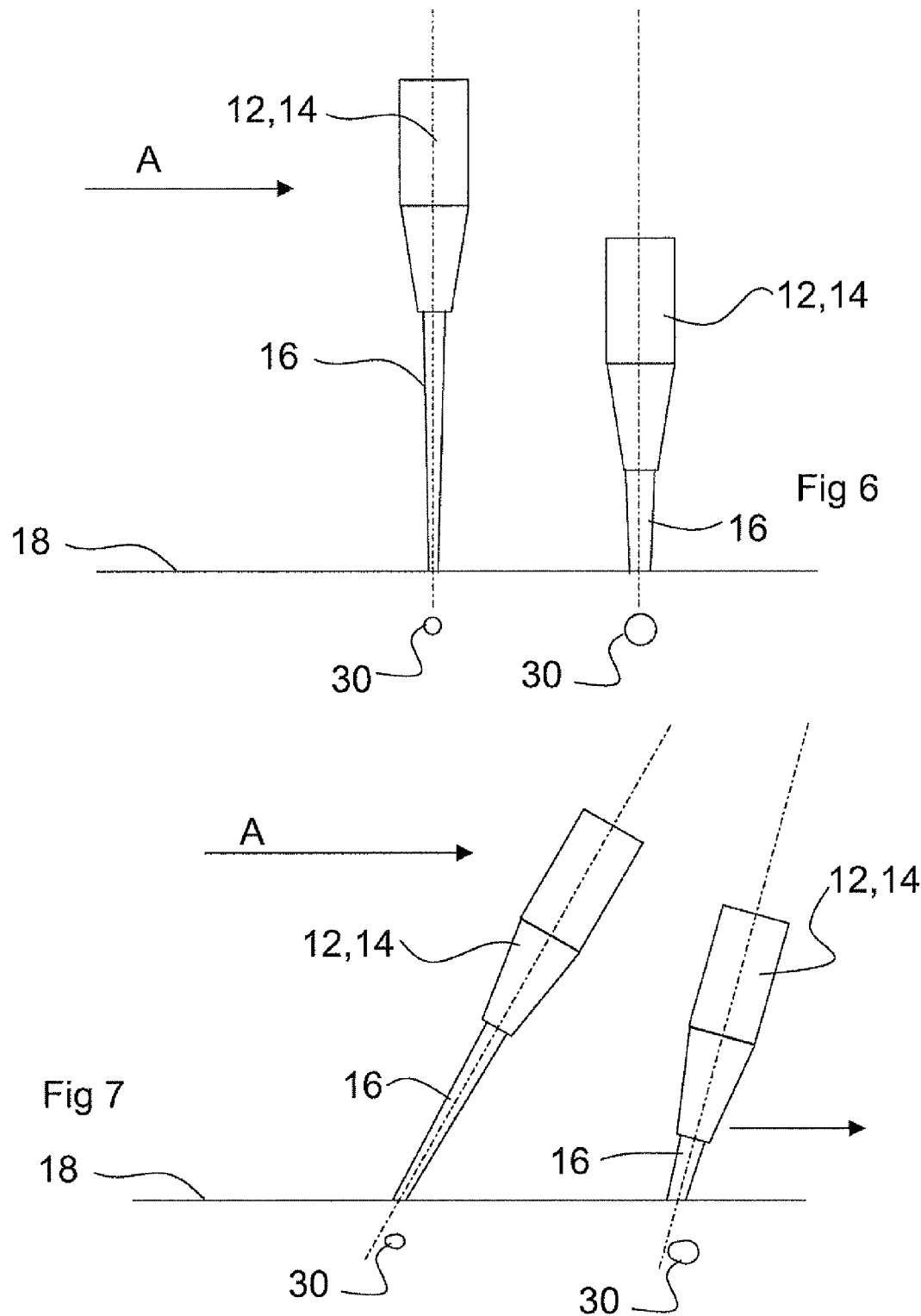

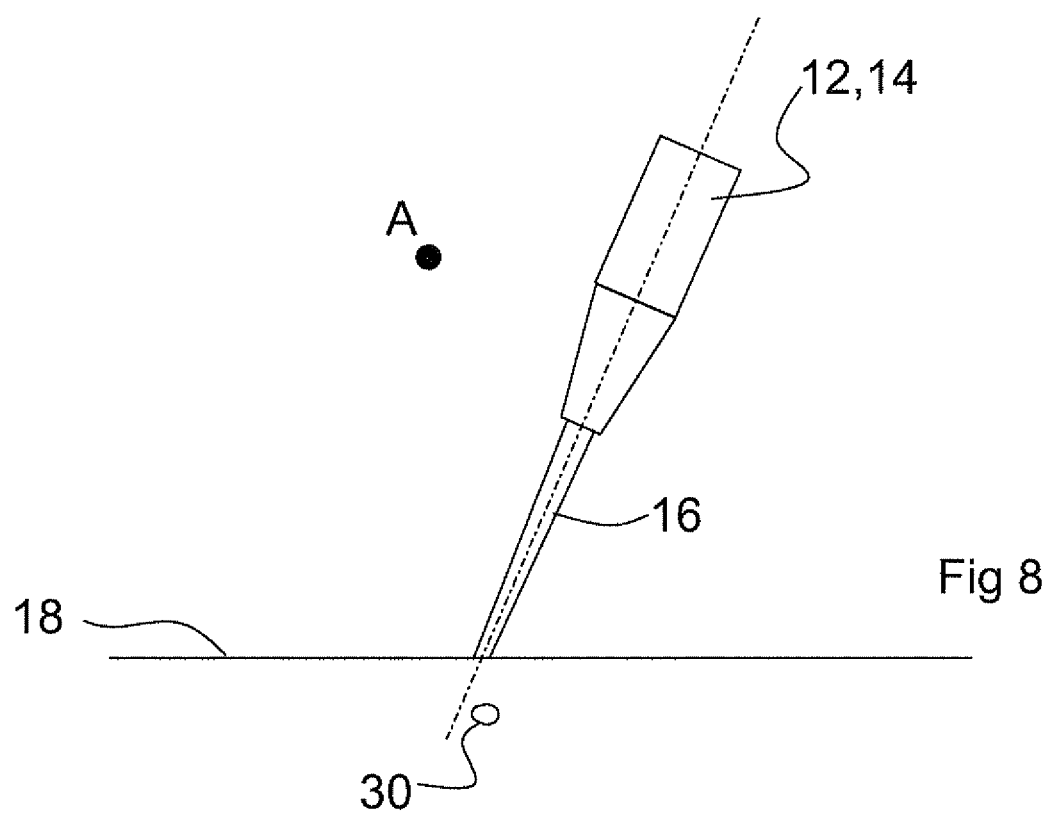

METHOD OF MANUFACTURING A COMPONENT

The present invention relates to a method of manufacturing a component.

In particular it relates to manufacturing a component by a material deposition process.

Manufacture of components by material deposition, for example by weld deposition, is known. In such processes a heating means (for example, a laser) is passed over a substrate, bringing a region of the substrate to a molten state as it moves relative to the substrate. Powdered material is delivered to the molten region, brought to a molten state, and then cooled such that it solidifies and creates a solid structure along the direction of travel of the heating means.

The weld material must be delivered to the molten region at a rate such that it is heated sufficiently and a consistent rate of material is deposited throughout the process. For this reason the speed of the heating means is kept constant to ensure the weld process is stable. For the same reason the orientation and position of the heating means relative to the substrate, and the heat output of the heating means, is also kept constant.

However, while such constraints will result in optimal build quality in most circumstances, it is not always necessary to have such constraints in place to achieve a desired end result of sufficient quality.

Hence a method of manufacture and apparatus which allows for a more flexible delivery of heat to a substrate during a material deposition process is highly desirable.

SUMMARY OF THE INVENTION

According to a first aspect of the invention there is provided a method of manufacturing a component comprising the steps of heating a working region of a substrate with a heating means; directing a material into the working region to bring the material into a temporary molten state; depositing said material on the substrate such that when the material solidifies it forms at least part of the component; wherein the heating means power output, stand off, orientation, speed and direction of travel relative to the substrate are adjustable and controlled throughout the material deposition process to control the shape and/or size of the working region to thereby control the distribution and rate of heat delivery to the substrate.

According to a second aspect of the invention there is provided apparatus for manufacture of a component by a material deposition process comprising a heating means for heating a working region of a substrate wherein the heating means power output, stand off, orientation, speed and direction of travel are adjustable and controllable throughout operation of the apparatus during the material deposition to thereby control the distribution and rate of heat delivery to the substrate.

BRIEF DESCRIPTION OF DRAWINGS

Embodiments of the invention will now be described with reference to the accompanying drawings, in which:

FIG. 6 is a side view of the heating means shown at two different distances relative to the substrate;

FIG. 7 is a side view of the heating means shown at two angles relative to the substrate in the direction of travel of the heating means, and at two different distances relative to the substrate;

FIG. 8 is an end on view of the heating means shown at an angle to the direction of travel of the heating means;

DETAILED DESCRIPTION OF EMBODIMENTS

Figure 1:
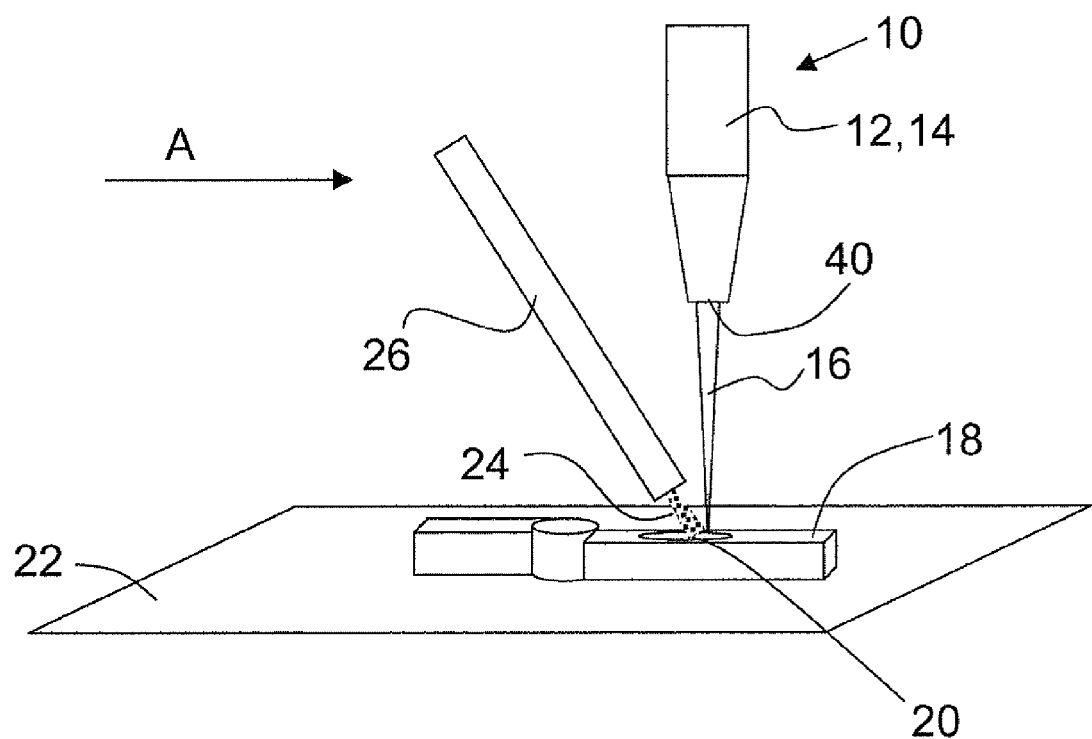
FIG. 1 is a diagrammatic representation of material deposition apparatus.

FIG. 1 is a diagrammatic representation of apparatus 10 for manufacture of a component by a material deposition process. In this example the process is a laser weld deposition process. The apparatus comprises a heating means 12 which is supported by an arm (not shown) which is computer controlled (not shown). The heating means 12 has an end face 40 through which a heat source is directed to create a heated volume. By way of example only, the heat source may be a coherent light energy (for example a laser), a plasma spray or high-velocity oxy-fuel spray. In the example shown the heating means is a laser 14. In FIG. 1 the laser 14 is shown generating a laser beam 16 which exits the end face 40 of the heating means 12 and is projected onto a substrate structure 18 to define a working region 20 of the substrate 18, and bring said working region 20 into a molten state. The energy beam 16 is focussed and shaped to define a heating zone 30 of constant size and geometry. The substrate is supported on a bed or fixture 22. Powdered material 24 is delivered to the working region via a delivery tube 26. The material 24 is brought into a temporary molten state and deposited on the substrate 18 such that when the material 24 solidifies it forms at least part of the resultant component. The heating means 12 is shown perpendicular to bed 22 and moving in a direction of travel indicated by arrow "A". However, as will be described, the heating means 12 stand off, orientation, speed and direction of travel relative to the substrate are adjustable and controllable throughout operation of the apparatus during the material deposition process to control the shape and/or size of the working region to thereby control the distribution and rate of heat delivery to the substrate 18. Additionally the power output from the heating means 12 is also adjustable and controllable during operation of the apparatus. Also the size and/or shape of the working region 20 of the substrate is controlled by adjustment of the heating means 12 stand off, orientation and/or direction of travel relative to the substrate throughout the material deposition process thereby adjusting the cross-sectional area and input power distribution of the heating zone throughout the material deposition process.

Figure 2:
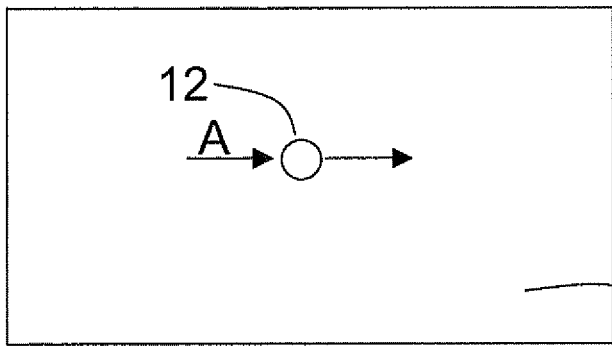
FIGS. 2 to 5 are plan views of a variety of different directions of travel of material deposition apparatus according to the present invention.

A plan view of the heating means 12 above the substrate 22 is shown in FIG. 2, with the heating means moving in direction A across the surface of the substrate 22.

Figure 3:
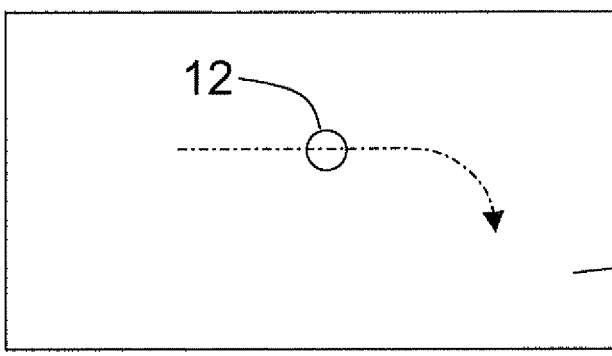
Figure 4:
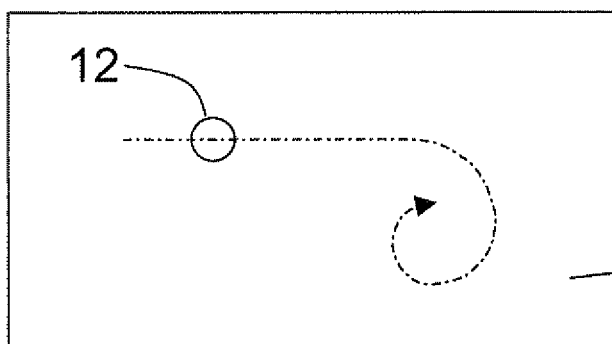

As shown in FIG. 3 the direction of travel relative to the substrate 22 is adjustable such that the path of the heating means is at least in part curved. That is to say, has a straight section and a curved section. The direction of travel relative to the substrate 18 is also adjustable such that the path of the heating means 12 is at least in part curved and has a variable curvature, as shown in FIG. 4. Thus the apparatus may be used to build structures with curved features.

Figure 5:
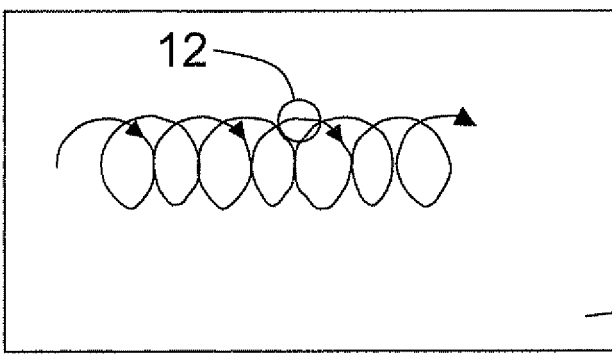

The direction of travel relative to the substrate 18 is also adjustable such that the path of the heating means 12 comprises a series of repeated curves, as shown in FIG. 5. In this mode of operation the heat will be distributed over a large area over the surface of the substrate 18.

As shown in FIG. 6 the heating means 12 stand off relative to the substrate 18 is adjustable by varying the heating means 12 distance relative to the substrate 18. In this context, "stand off" refers to the distance between the end face 40 of the heating means and a working region 20 on the substrate. The heating means 12 may be kept perpendicular to the surface of the substrate 18, in which case the stand off is the vertical distance from the end face 40 of the heating means and the substrate. In embodiments where the heating means 12 is at an angle to the substrate, the stand off is the distance from the end face 40 of the heating means 12 to the substrate 18 in a direction which is at the said angle to the substrate. The heating means 12 may be moving in a direction parallel to the surface of the substrate 18 in a direction indicated by arrow "A". In the embodiment shown the heating means is a laser 14, and hence varying the height (and hence the stand off) of the laser will alter the size of the laser beam cross section 30 (or "heating zone" or "spot", shown in plan view beneath the line 18 depicting the substrate surface) at the point it impinges on the substrate. Thus as in the arrangement to the left in FIG. 6, the cross section 30 is relatively small and hence the energy density will be high, thereby creating a molten region (or "weld pool") of greater depth but less surface area than the arrangement to the right of in FIG. 6, where the spot is larger and hence the weld pool will be shallower but have a larger surface area on the substrate surface for a constant energy output.

As shown in FIG. 7 the heating means 12 orientation relative to the substrate 18 is adjustable by varying the angle of the heating means 12 relative to the substrate 18 in the direction of travel "A" of the heating means 12 relative to the substrate 18. This will alter the shape of the spot 30 and hence adjust the shape and heat distribution of the resultant working region. The laser 14 is shown with a different stand off to the left of the figure than to the right, which will alter the depth and surface area of the weld pool as described with reference to FIG. 6. The heating means 12 orientation relative to the substrate 18 may be adjusted by varying the angle of the heating means 12 relative to the substrate 18 between zero and 90 degrees in the direction of travel A of the heating means 12 relative to the substrate 18.

Likewise, as shown in FIG. 8, the heating means 12 orientation relative to the substrate is adjustable by varying the angle of the heating means 12 relative to the substrate 18 at an angle to the direction of travel A of the heating means 12 relative to the substrate 18. That is to say, "tilting" the heating means. Hence the view in FIG. 8 is a view looking end on (i.e. in the direction of travel A in any one of the preceding figures), with the heating means 12 directing energy at an angle to the direction of travel (as opposed to in the direction of travel, as shown in FIG. 7). The distance of the heating means 12 may also be varied relative to the substrate 18. These actions have the same effect on the spot shape and size as described with reference to FIGS. 6 and 7. The heating means 12 orientation relative to the substrate is may be adjusted in a direction at an angle between zero degrees and 90 degrees to the direction of travel A of the heating means 12 relative to the substrate 18.

Figure 9:
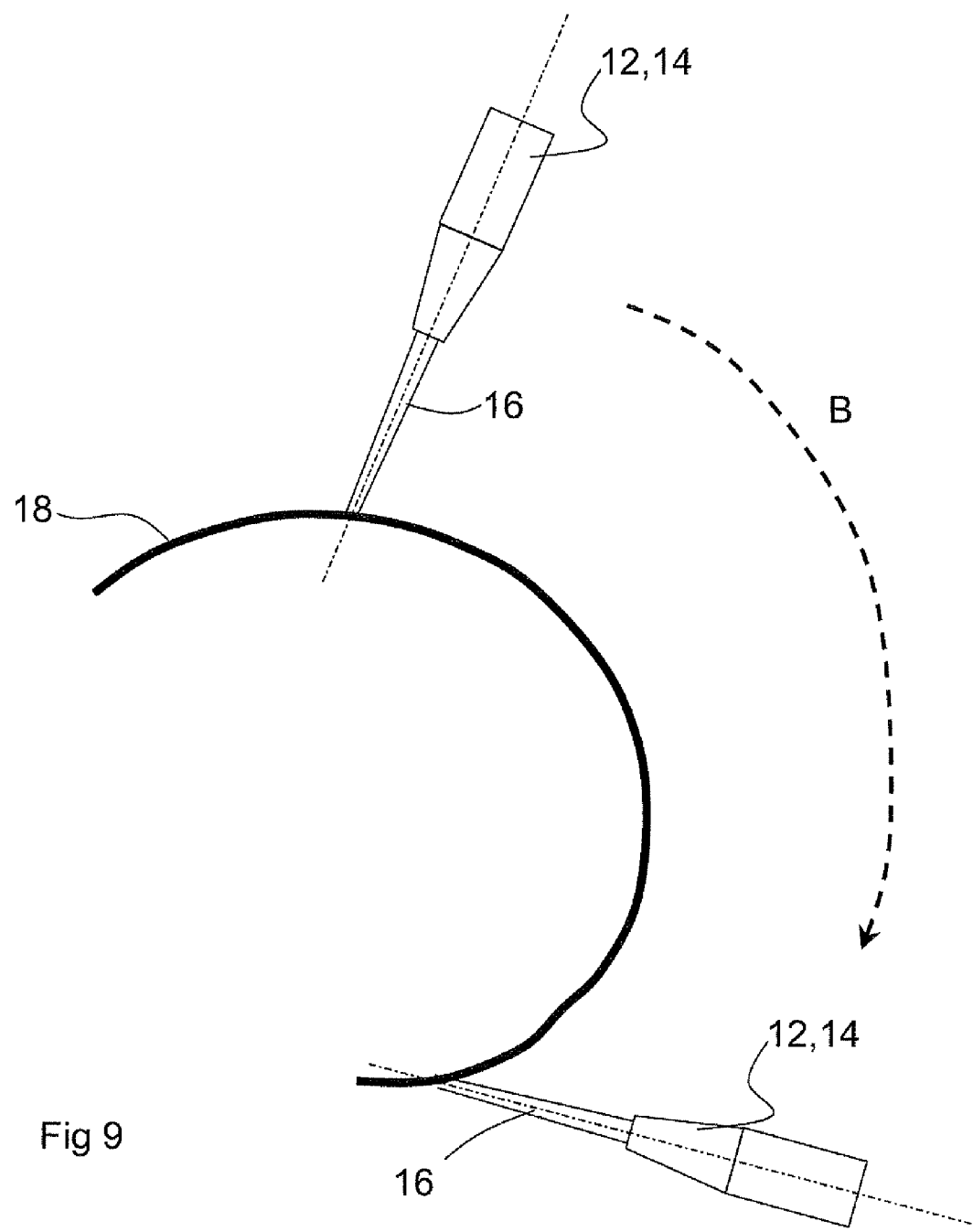
FIG. 9 and FIG. 10 shows the heating means being translated to match the curvature of the substrate.
Figure 10:
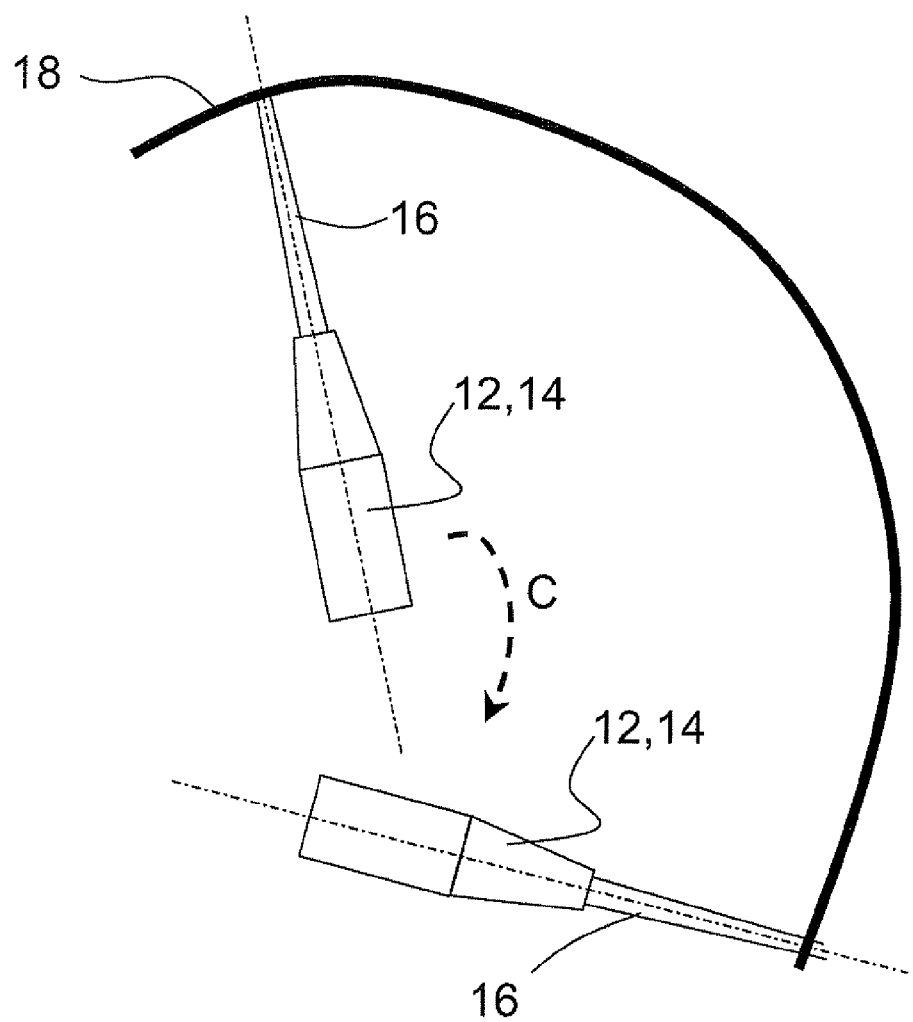

As shown in FIG. 9 and FIG. 10, the orientation and direction of travel of the heating means 12 may be adjusted to substantially match the curvature of the substrate 18. In the example shown the substrate 18 is arcuate with regions of constant and varying curvature. The curvature may extend and vary in three dimensions. The heating means 12 is moved relative to the substrate in the direction of travel indicated by arrow "B" in FIG. 9 and "C" in FIG. 10. At the same time the heating means 12 is rotated such that its end face 40 is directed towards the substrate. However, the angle of the heating means 12 relative to the substrate may not be constant throughout the travel and rotation, thereby varying the heating zone spot size and shape, or maintaining the heating zone spot size and shape, as required.

The heating means 12 speed relative to the substrate is adjustable by varying the speed of the heating means 12 end face 40 in the direction of travel. It will be appreciated that, with all other parameters being constant, the size of the molten pool created in the working region will be directly proportional to the speed of travel of the heating means 12. Hence the slower the speed of travel, the larger the size of the molten pool. A larger weld pool will catch and melt more powder, resulting in a larger deposited bead cross sectional area.

The rate at which material 24 is delivered to the working region 20 is adjusted and controlled throughout the material deposition process.

While the different modes in which the heating means 12 may be adjusted relative to the substrate have been described individually, an essential feature of the present invention is that all of the previously described adjustments may be made individually, or two or more of the modes of adjustment may be made in combination during the material deposition process.

Figure 11:
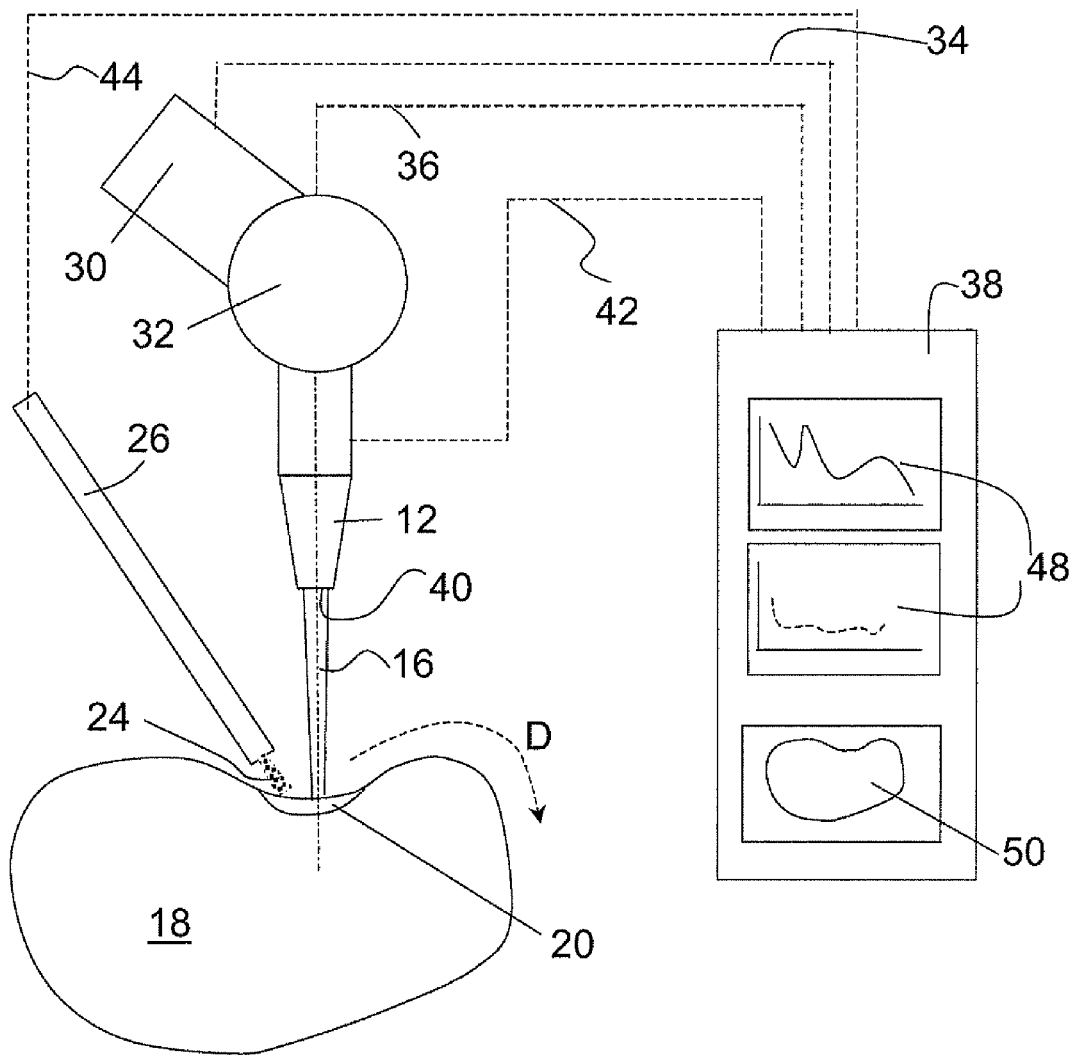
FIG. 11 shows a diagrammatic representation of an example of the apparatus of the present invention.

Presented in FIG. 11 is a diagrammatic representation of an example embodiment of apparatus of the present invention. The apparatus comprises a heating means 12 which is supported by an arm 30 via a pivotable joint 32. The arm 30 is connected to a machine tool (not shown). The pivotable joint 32 permits motion in a plurality of dimensions. The arm 30 and pivotable joint 32 are in communication via a first link 34 and second link 36 respectively with a computer 38. In the example shown the heating means 12 has an end face 40 through which a heat source is directed. By way of example only, the heating means 12 may be a source of coherent light energy (for example a laser). In FIG. 11 the laser 14 is shown generating a laser beam 16 which exits the end face 40 of the heating means 12 and is projected onto the substrate structure 18 to define a working region 20 of the substrate 18, and bring said working region 20 into a molten state. The energy beam 16 is focussed and shaped to define a heating zone 30 of constant size and geometry. Powdered material 24 is delivered to the working region 20 via a delivery tube 26. The material 24 is brought into a temporary molten state and deposited on the substrate 18 such that when the material 24 solidifies it forms at least part of the resultant component. In this embodiment the heating means 12 is shown perpendicular to the substrate and moving in a direction of travel indicated by arrow "D". The heating means 12 is in communication with the computer 38 via a third link 42. The delivery tube 26 is in communication with the computer 38 via a fourth link 44.

The heating means 12 heating means power output, stand off, orientation, speed and direction of travel are adjustable and controllable throughout operation of the apparatus during the material deposition process by the computer 38 via links 34, 36, 42 and 44. The computer sends a signal via the first link 34 to the arm 30 to control the stand off, orientation, speed and direction of travel of the heating means 12. The computer sends a signal via the second link 36 to the pivotable joint 32 to further adjust the stand off and orientation of the heating means 12. The energy output and energy distribution of the heating means is controlled by the computer via the third link 42. The rate of delivery of the powder 24 through the delivery tube 26 is controlled by the computer via the fourth link 44.

The computer controls the heating means 12 power output, stand off, orientation, speed and direction of travel relative to the substrate, and the powder 24 delivery rate, by way of look up tables 48 stored in the computer 40 in conjunction with a model 50 which defines the geometry of the component to be manufactured. That is to say, for a given feature (e.g. part of component being built up) of the component defined by the model 50, the computer will determine the optimal power output, stand off, orientation, speed and direction of travel of the heating means 12 relative to the substrate 18 and the rate of powder 24 delivery via the delivery tube 26 to generate the feature based on data provided from the look up tables 48. The look up tables are generated empirically and/or by modelling.

Empirical data defining optimum heating means operation may be produced by monitoring parameters defining the manufacturing process during trials and/or actual manufacture. For example substrate temperature, dimensional and geometric accuracy may be monitored. Thermocouples, pyrometers and or a thermal camera may be employed to build a thermal history of regions being created. The data is reviewed and used to refine the manufacturing process. A library of known standard primitive deposited features (for example one bead, two overlapping beads, corners, walls of a given length width and height) may be used to populate a generative parametric predictive system without recourse to Finite Element modelling for component being manufactured. Hence the "look up tables" define the way the heating means 12 will operate during the build of a given component, thus enabling an automated "expert system".

The method and apparatus of the present invention enable an efficient and stable deposition process because the temperature and size of the working region can be tuned to precisely that required achieve the desired resultant geometry and to heat the underlying structure in only the required locations to the required temperature. Hence the present invention enables the construction of components with more complex geometries and also results in less material wastage, feature overbuild, more consistent microstructures.

Control of the heating zone 30 size and shape results in better control of thermal management and heat dissipation in the substrate, since the amount of heat being delivered to the substrate is more tightly controlled.

The heating means 12 power output, stand off, orientation, speed and direction of travel relative to the substrate are computer controlled. The present invention may also comprise software to optimise the power output, stand off, orientation, speed and direction of travel of the heating means 12 via a process simulation prior a material deposition process. This would enable automation of the material deposition sequence. Interpolating and verifying the variation between measured and characterised response conditions could enable generation of control curves or response strategies for use in process controls. The curves or strategies may be applied under at particular stages in a deposition process. As the process progresses, alternate control curves or strategies could be activated.

The invention claimed is:

1. A method of manufacturing a component comprising the steps of:
    defining a component geometry model representative of the component to be manufactured, the component geometry model comprising a plurality of geometric features of the component;
    for each geometric feature, using a lookup table comprising a library of known standard features to determine optimal values of a set of parameters comprising power output, position, orientation, speed and direction of travel of a heating means relative to a substrate and an optimal rate of powder delivery, to generate the feature using the known standard features;
    heating a working region of the substrate with the heating means;
    directing a material into the working region to bring the material into a temporary molten state;
    depositing said material on the substrate such that when the material solidifies it forms at least part of the component;
    controlling by a control unit through a plurality of links, throughout the material deposition process, wherein the set of parameters are controlled to correspond to the optimal values to control the shape and/or size of the working region to thereby control the distribution and rate of heat delivery to the substrate.

2. A method as claimed in claim 1 wherein the rate at which material is delivered to the working region is controlled throughout the material deposition process.

3. A method of manufacturing a component as claimed in claim 1 wherein the heating means stand off relative to the substrate is adjusted by varying the heating means distance relative to the substrate.

4. A method of manufacturing a component as claimed in claim 1 wherein the heating means orientation relative to the substrate is adjusted by varying the angle of the heating means relative to the substrate in the direction of travel of the heating means relative to the substrate.

5. A method of manufacturing a component as claimed in claim 1 wherein the heating means orientation relative to the substrate is adjusted by varying the angle of the heating means relative to the substrate at an angle to the direction of travel of the heating means relative to the substrate.

6. A method of manufacturing a component as claimed in claim 1 wherein the orientation of the heating means is adjusted to substantially match the curvature of the substrate.

7. A method of manufacturing a component as claimed in claim 1 wherein the heating means speed relative to the substrate is adjusted by varying the speed of the heating means in the direction of travel.

8. A method of manufacturing a component as claimed in claim 1 wherein the direction of travel relative to the substrate is adjusted such that the path of the heating means is at least in part curved.

9. A method of manufacturing a component as claimed in claim 8 wherein the direction of travel relative to the substrate is adjusted such that the path of the heating means is at least in part curved and has a variable curvature.

10. A method of manufacturing a component as claimed in claim 1 wherein the direction of travel of the heating means is adjusted to substantially match the curvature of the substrate.

11. A method of manufacturing a component as claimed in claim 1 wherein the heating means comprises a means for generating an energy beam which is focused and shaped to define a heating zone of constant size and geometry which is projected on the substrate to define the working region.

12. A method of manufacturing a component as claimed in claim 11 wherein the size of the working region of the substrate is controlled by adjustment of the heating means stand off and orientation relative to the substrate throughout the material deposition process thereby adjusting the cross-sectional area of the heating zone throughout the material deposition process.

13. A method of manufacturing a component as claimed in claim 11 wherein the shape of the working region of the substrate is controlled by adjustment of the heating means stand off, orientation and/or direction of travel relative to the substrate throughout the material deposition process thereby adjusting the cross-sectional shape of the heating zone throughout the material deposition process.

14. A method of manufacturing a component as claimed in claim 1 wherein the method comprises a laser weld deposition process.

15. Apparatus for manufacture of a component by a material deposition process comprising:
- a component geometry model representative of the component to be manufactured, the model comprising a plurality of geometric features of the component,
- a heating means for heating a working region of a substrate, wherein each geometric feature is generated using known standard features based upon a lookup table comprising a library of the known standard features used to determine optimal values of a set of parameters comprising power output, position, orientation, speed and direction of travel of the heating means relative to the substrate and an optimal rate of powder delivery; and
- a control unit for controlling the set of parameters through a plurality of links, throughout the material deposition process, the set of parameters being controlled to correspond to the optimal values to thereby control the distribution and rate of heat delivery to the substrate.

* * * * *